United States Patent
Dorius et al.

[11] Patent Number: 6,055,128
[45] Date of Patent: *Apr. 25, 2000

[54] DUAL ETCH STEP PAD AIR BEARING DESIGN WITH THREE ETCH DEPTHS

[75] Inventors: Lee Kevin Dorius; Sanford Anthony Bolasna, both of San Jose, Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/857,115

[22] Filed: May 14, 1997

[51] Int. Cl.[7] .............................. G11B 17/32; G11B 21/21
[52] U.S. Cl. ................................................................. 360/103
[58] Field of Search ........................ 360/103; 29/603.07, 29/603.12, 603.15, 603.18

[56] References Cited

U.S. PATENT DOCUMENTS

| | | | |
|---|---|---|---|
| 4,564,585 | 1/1986 | Blaske et al. | 430/313 |
| 4,624,048 | 11/1986 | Hinkel et al. | 360/103 |
| 4,673,996 | 6/1987 | White | 360/103 |
| 5,067,037 | 11/1991 | Ananth et al. | 360/103 |
| 5,200,686 | 4/1993 | Chapin et al. | 360/103 |
| 5,220,470 | 6/1993 | Ananth et al. | 360/103 |
| 5,285,337 | 2/1994 | Best et al. | 360/103 |
| 5,309,303 | 5/1994 | Hsia et al. | 360/103 |
| 5,327,311 | 7/1994 | Ananth et al. | 360/103 |
| 5,404,256 | 4/1995 | White | 360/103 |
| 5,418,667 | 5/1995 | Best et al. | 360/103 |
| 5,424,888 | 6/1995 | Hendriks et al. | 360/103 |
| 5,473,485 | 12/1995 | Leung et al. | 360/103 |
| 5,479,306 | 12/1995 | Ananth et al. | 360/103 |
| 5,499,149 | 3/1996 | Dovek | 360/103 |
| 5,508,861 | 4/1996 | Ananth et al. | 360/103 |
| 5,508,862 | 4/1996 | Lazzari et al. | 360/103 |
| 5,513,056 | 4/1996 | Kawasaki et al. | 360/103 |
| 5,550,693 | 8/1996 | Hendriks et al. | 360/103 |
| 5,566,075 | 10/1996 | Syouji et al. | 364/468.24 |
| 5,567,333 | 10/1996 | Hira et al. | 216/22 |
| 5,572,386 | 11/1996 | Ananth et al. | 360/103 |
| 5,625,513 | 4/1997 | Utsunomiya et al. | 360/103 |
| 5,777,825 | 7/1998 | Dorius | 360/103 |
| 5,796,551 | 8/1998 | Samuelson | 360/103 |
| B1 4,870,519 | 1/1997 | White | 360/103 |

FOREIGN PATENT DOCUMENTS

| | | | |
|---|---|---|---|
| 56-107363 | 8/1981 | Japan. | |
| 59-98347 | 6/1984 | Japan | 360/103 |
| 3-132981 | 6/1991 | Japan | 360/103 |
| 4-114377 | 4/1992 | Japan. | |
| 7-6537 | 1/1995 | Japan. | |

*Primary Examiner*—David L. Ometz
*Attorney, Agent, or Firm*—R. B. Martin

[57] ABSTRACT

An air bearing slider having reduced mask misalignment sensitivities. For one embodiment, the air bearing slider has three etch surfaces formed by a dual etch process. The leading and trailing step regions are formed by a first etching step. The lateral step regions, adjacent to the air bearing pads, are formed by a second etching step. The negative pressure region is formed by both the first and second etching steps.

12 Claims, 8 Drawing Sheets

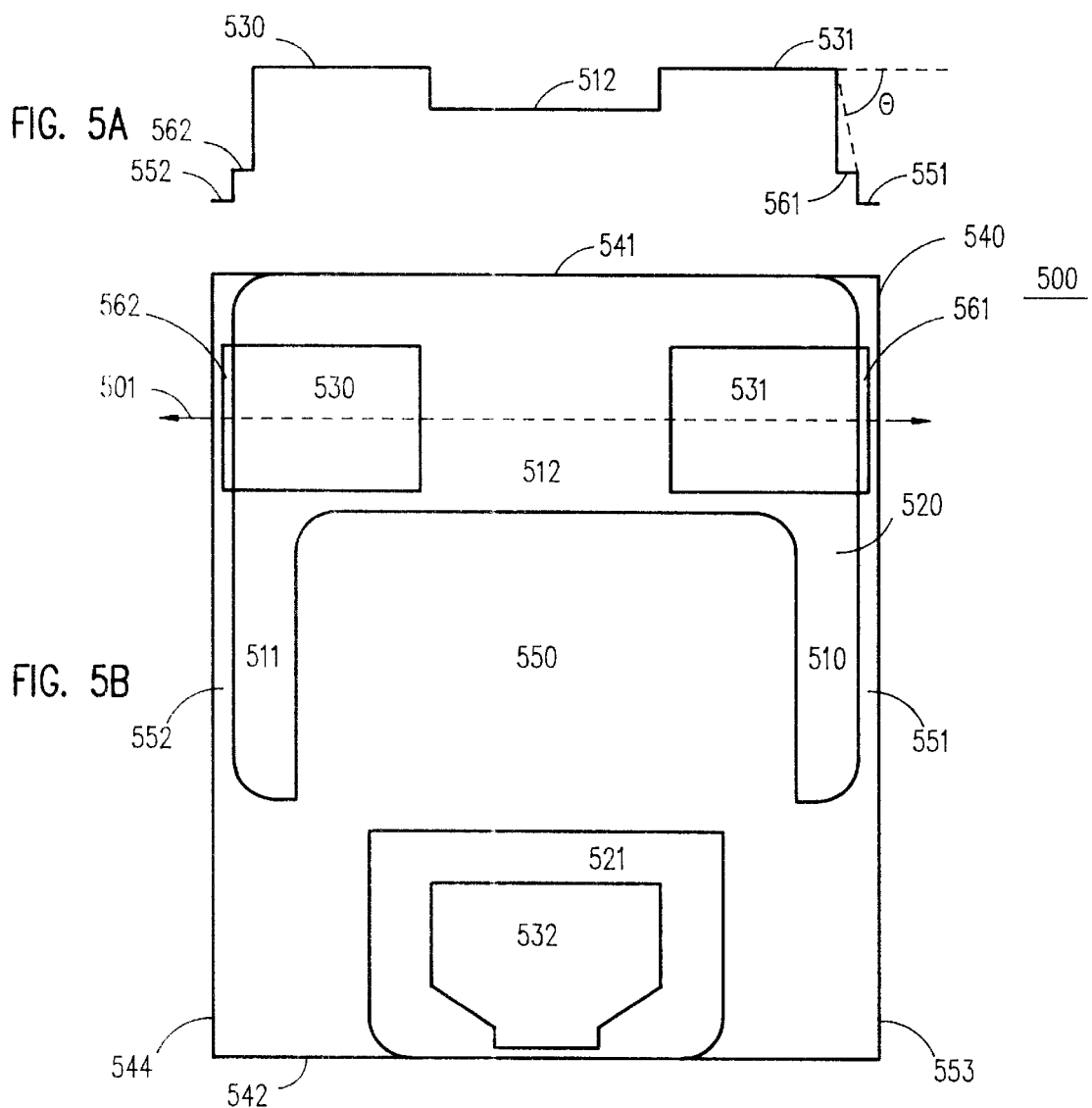

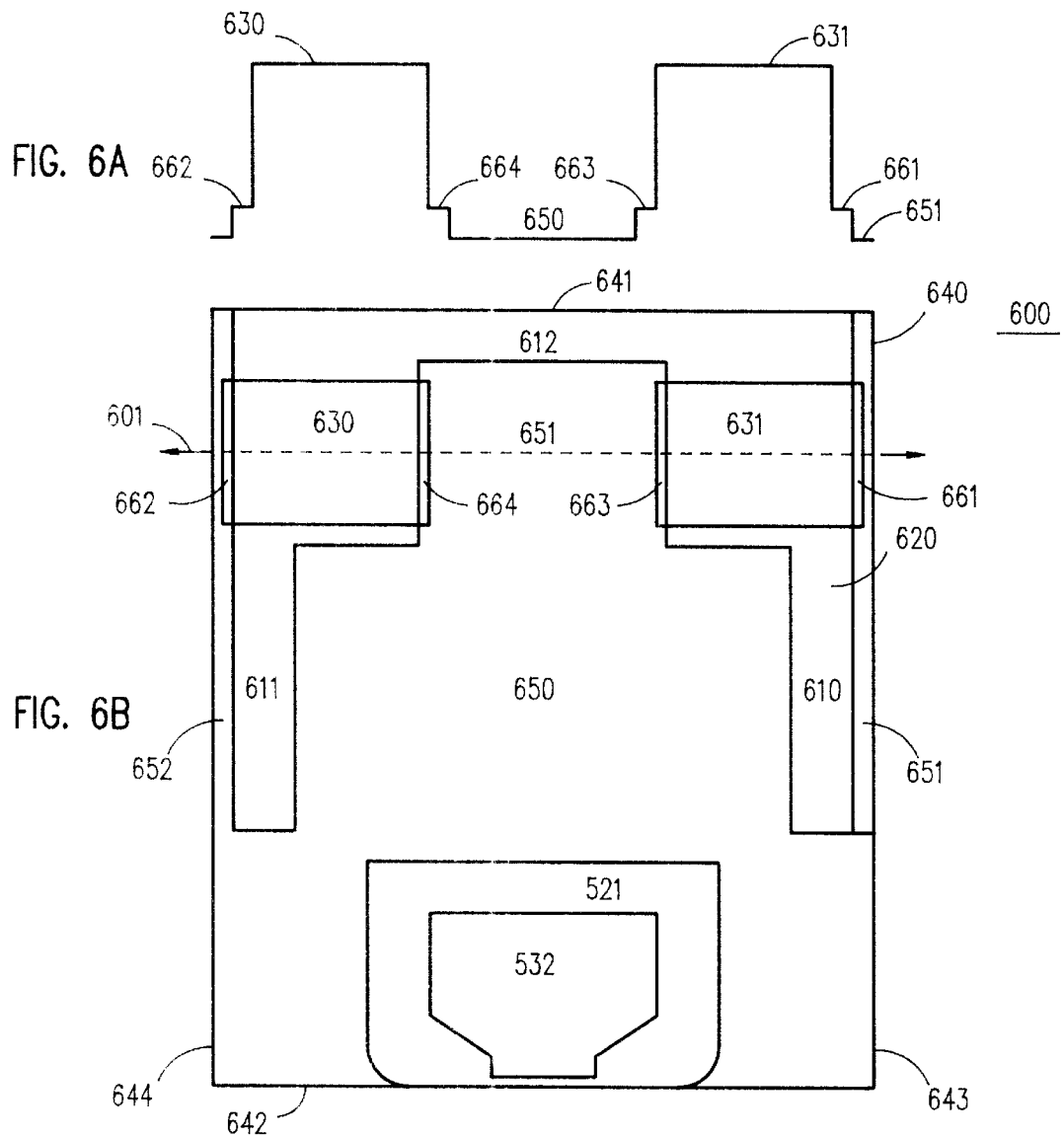

DUAL ETCH STEP PAD AIR BEARING DESIGN WITH THREE ETCH DEPTHS

CROSS-REFERENCE TO RELATED APPLICATION

This application is related to application Ser. No. 08/858,208, entitled "DUAL ETCH STEP PROCESS FOR MAKING A THREE ETCH DEPTH AIR BEARING SLIDER", in the name of S. Bolasna et al, filed concurrently herewith.

BACKGROUND OF THE INVENTION

1. Field of the Invention

This invention relates to air bearing sliders for use in disk drives, and more particularly, to air bearing sliders that are less sensitive to mask misalignments.

2. Description of Related Art

Conventional magnetic disk drives refer to information storage devices that store data on at least one rotatable magnetic media (or disk) having concentric data tracks. Conventional disk drives include a spindle on which the disks are mounted, a spindle motor that spins the disks when the drive is in operation, one or more read/write heads that perform the actual reading and writing of data, a second motor that positions the read/write heads over the disks, and controller circuitry that synchronizes read/write activities and transfers information to and from the computer or data processing system. A read/write head may include a magnetic transducer (also referred to as a read/write transducer) for reading and writing data on the various tracks. The read/write transducer is typically mounted or integrally formed on an air bearing slider. The air bearing slider supports the read/write transducer above the recording media and adjacent to the data tracks during reading and writing operations of the drive.

In magnetic recording technology, it is continually desired to improve the areal density at which information can be recorded and reliably read. One factor that limits the recording density of a magnetic disk drive is the distance between the read/write transducer and the magnetic media. This distance is often referred to as the "fly height" of the air bearing slider. As the area density of the magnetic media is increased, smaller fly heights are required so that the read/write transducer can distinguish between the magnetic fields emanating from closely spaced regions on the magnetic media. Accordingly, air bearing sliders are typically designed to fly the air bearing slider as close as possible to the magnetic media while avoiding physical impact with the magnetic media.

Various factors are known to affect the fly height of an air bearing slider. For example, the fly height of an air bearing slider is affected as the actuator arm is moved radially across the disk to access the various data tracks. This is due to differences in linear velocity of the disk at differing radii between the inner-diameter (ID) and the outer-diameter (OD) of the disk. Additionally, an air bearing slider may experience changes in fly height due to variations in skew, roll, and crown of the air bearing slider. The altitude sensitivity of an air bearing slider may also affect the fly height. As the altitude increases, the fly height drops corresponding to the drop in atmospheric pressure. Furthermore, variations in the physical characteristics of an air bearing slider that results from manufacturing tolerances may also affect the fly height. For example, the misalignment of masks used to form the various surfaces may vary the physical characteristics of the air bearing slider.

One prior art air bearing slider is a negative pressure air bearing slider having two etch depths formed by a two step etching process, as shown in FIG. 1. FIG. 1 illustrates an air bearing slider 100 having a support structure 140 (also referred to as a slider body), a first etch surface including a leading step region 120 and a trailing step region 121, a second etch surface including a negative pressure region 150, and an air bearing surface including leading pads 130 and 131 and a trailing pad 132. The depth of each etch surface is measured from the air bearing surface of air bearing slider 100.

The leading step region 120 and trailing step region 121 are formed by a first etch and therefore referred to as the first etch surface. The first etch may be a shallow etch of about 0.11 microns. The leading step region 120 has two side rails that are joined together at leading edge 141 of slider body 140 and extend toward trailing edge 142 of slider body 140.

The pocket defined by the two side rails of leading step region 120 is referred to as negative pressure region 150 and is formed by a second etch. The second etch may be optimized anywhere between 0.5 microns and 5.0 microns to minimize the altitude sensitivity of air bearing slider 100. Typically, the second etch depth refers to the first etch depth plus a delta value such that the area defined as the second etch surface is actually etched during the first and second etch steps. Although this prior art approach reduces the altitude sensitivity of air bearing slider 100, it does not reduce mask misalignment sensitivities of air bearing slider 100 that may also affect the flying height.

Another prior art approach uses a three step etching process to form three etch surfaces. FIGS. 2A–2B illustrate a three etch depth air bearing slider. According to FIGS. 2A–2B, the air bearing slider includes four transverse pressure contour (TPC) pads 222 and a negative pressure pad 226. The TPC pads 222 are defined by a face 234 for creating a gas bearing effect, a generally U-shaped TPC section 228 including a constant depth step bearing along each side edge 236 of face 234 and a constant depth step along leading edge 238 forming a converging compression inlet 232. Thus, the gas bearing contour of TPC pad 222 is defined by two parallel planes created by two different etch steps with a slight off-set.

The negative pressure pad 226 is defined by a substantially planar surface which contains a recess 240 open at the trailing end 225. The negative pressure pad 226 may also include one or more bearing faces 242 at a height approximately that of faces 234 and TPC pads 222 for creating a gas bearing effect. Recess 240 is open along the trailing edge 225; that is, substantially ambient.

The ambient pressure reservoir 230 defines a cavity 244 having a depth and configuration sufficient to maintain substantial ambient pressure in the cavity during movement of the disk. Furthermore, ambient pressure reservoir 230 includes a non-tapered (non-stepped, non-convex) inlet along a leading edge 223 so as to inhibit the generation of gas bearing effects created by compression of inlet gas.

In order to ensure cavity 244 creates an ambient pressure reservoir 230, cavity 244 must be etched deep enough to ensure ambient pressure. According to this slider design, the etch steps used to form the U-shaped TPC section 228 and recess 240, alone or in combination, are not deep enough to form cavity 244. Thus, the prior art design shown in FIGS. 2A–2B requires three etch steps to form the three etch surfaces. One drawback of this slider design is that an air bearing slider manufactured with a three step etching process is more costly to manufacture than the same slider if manufactured with a two step etching process.

SUMMARY OF THE INVENTION

It is desirable to provide an air bearing slider that maintains a relatively uniform flying height.

It is also desirable to provide a three etch depth slider that can be manufactured using a two step etching process.

Furthermore, it is desirable to provide an air bearing slider that is less sensitive to the misalignment of masks used to form the air bearing surface.

An air bearing slider for supporting a transducer is described. The air bearing slider includes a slider body having leading and trailing edges. Substantially adjacent to the leading edge is a leading step region and substantially adjacent to the trailing edge is a trailing step region. Both the leading and trailing step regions have a first etch depth. At least one leading pad having an air bearing surface is formed on the leading step region and at least one trailing pad having an air bearing surface is formed on the trailing step region. External to both the leading and trailing step regions is at least two lateral step regions having a second etch depth. The air bearing slider also includes a negative pressure region having a third etch depth. The third etch depth is dependent on both the first and second etch depths. For one embodiment, the third etch depth equals the sum of the first and second etch depths.

Other desires, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar element, and in which:

FIGS. 5A–B illustrates another embodiment of the air bearing slider;

FIGS. 6A–B illustrates one embodiment of the air bearing slider having an increased negative pressure region;

DETAILED DESCRIPTION OF THE INVENTION

For one embodiment, the air bearing slider is a negative pressure air bearing slider having three etch depths. The three etch depths are used to reduce or substantially eliminate the mask misalignment sensitivity of the air bearing slider along the lateral axis of an air bearing slider during manufacturing. By designing an air bearing slider that is less sensitive to mask misalignments, mask misalignments have a reduced effect on the fly height of the air bearing slider. A significant advantage for one embodiment of the present invention is that the three etch depths may be formed by performing a dual etch step process.

Figure 1:
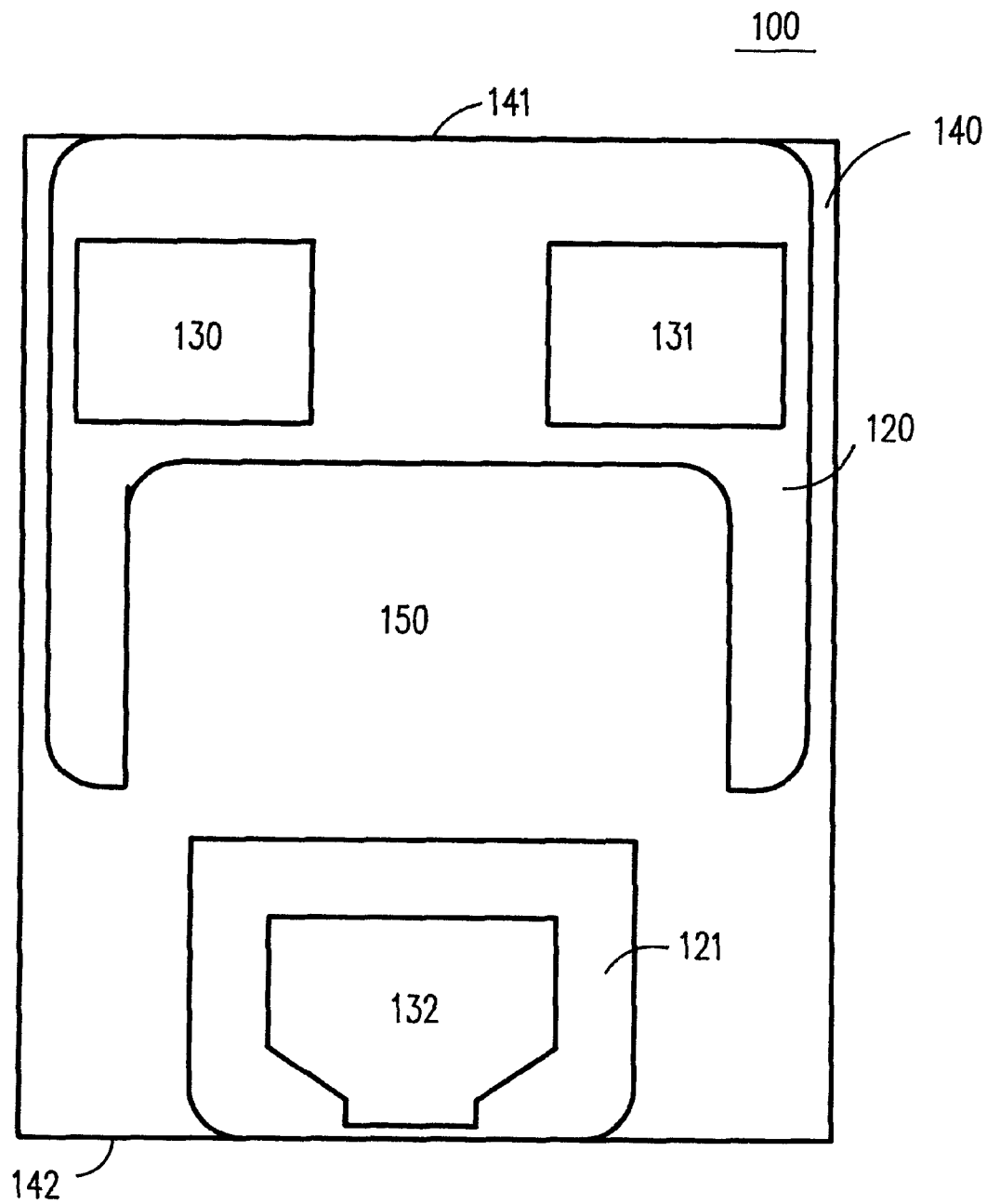
FIG. 1 illustrates a conventional two etch depth air bearing slider having reduced altitude sensitivity.
Figure 2A:
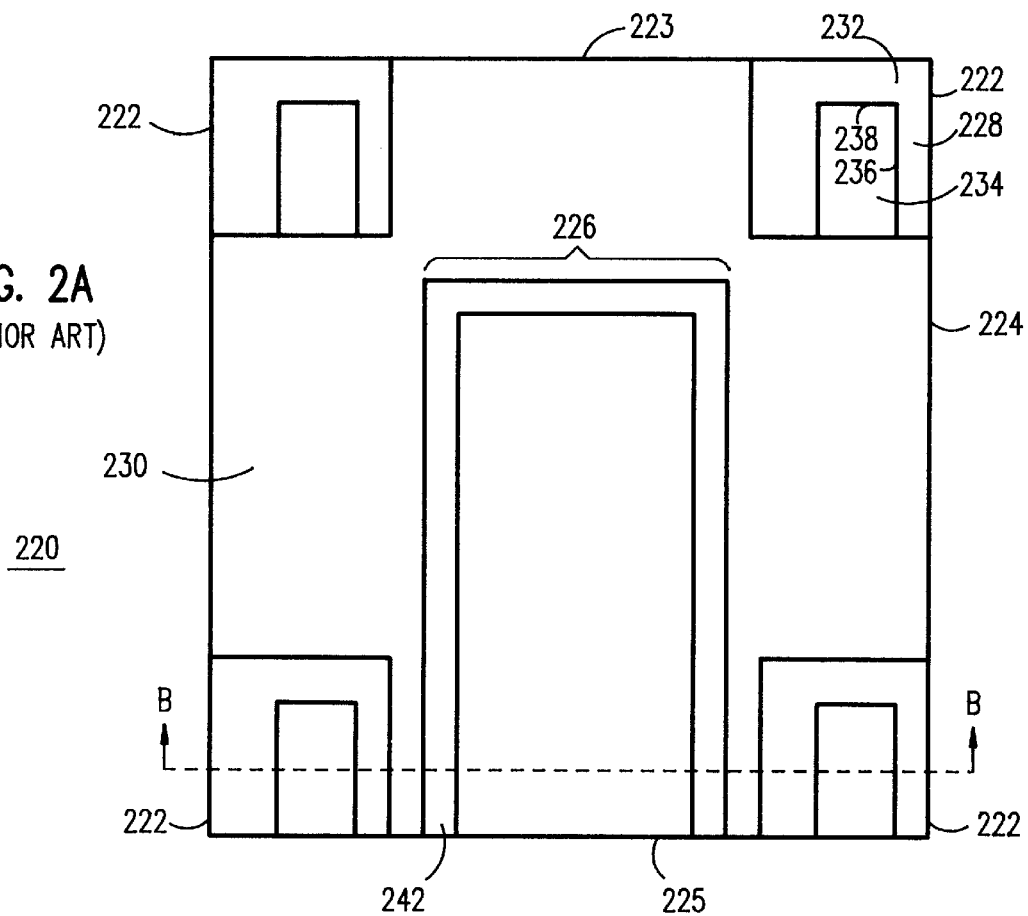
FIGS. 2A–B illustrate a conventional three etch depth air bearing slider.
Figure 2B:
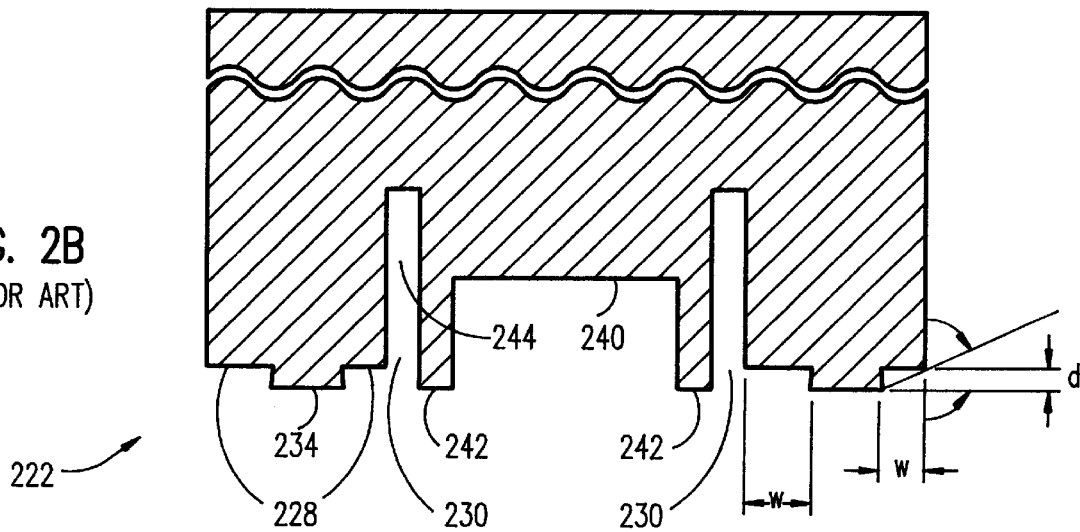
Figure 3:
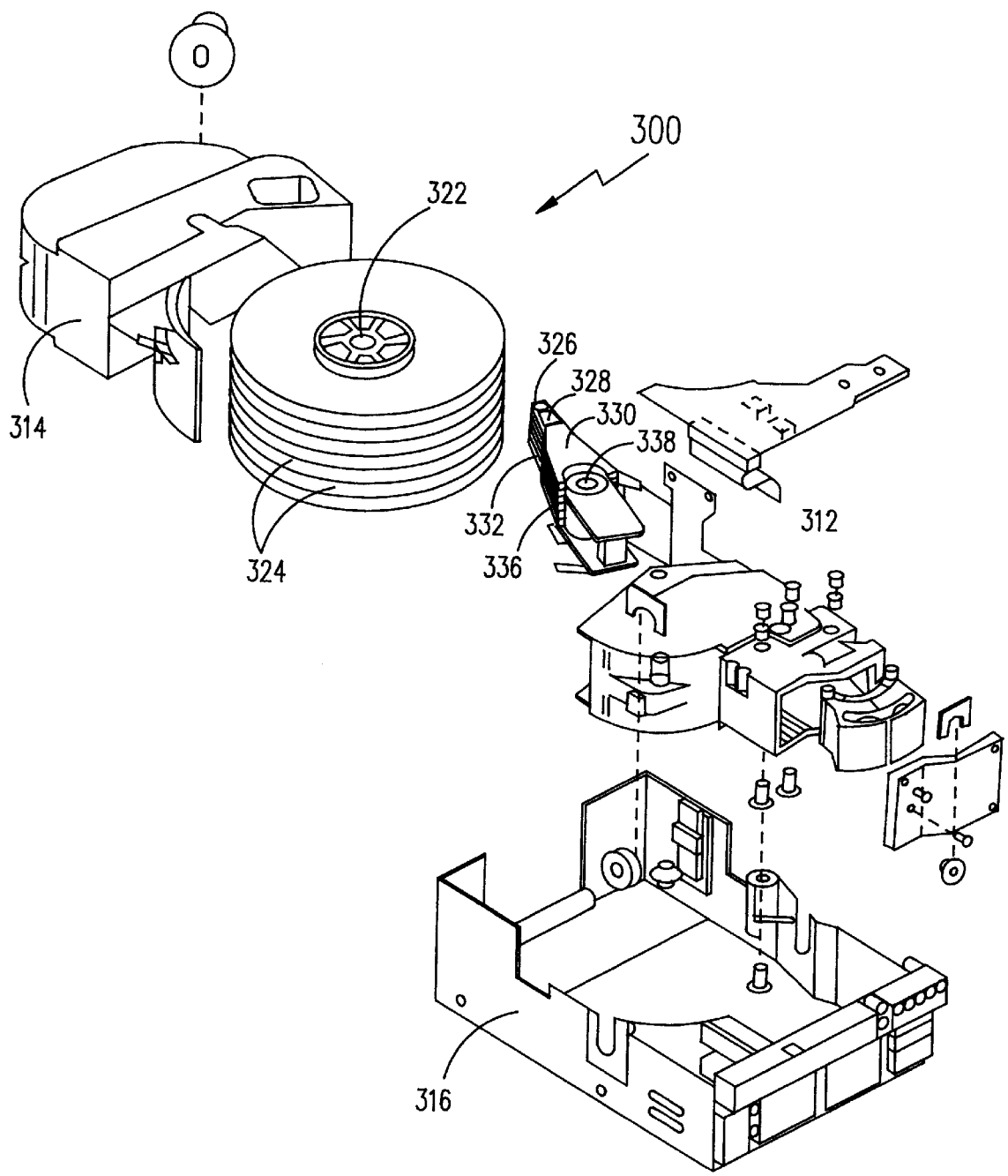
FIG. 3 illustrates an exploded view of a disk drive suitable for practicing the present invention.

FIG. 3 illustrates an exploded view of a disk drive 300 that may include the air bearing sliders of the present invention. The disk drive 300 includes a housing 312 and a housing cover 314 which, after assembly, is mounted within a frame 316. Mounted within housing 312 is a spindle shaft 322. Rotatably attached to the spindle shaft 322 are a number of disks 324. For one embodiment, eight disks 324 are attached to spindle shaft 322 in a spaced apart relation. The disks 324 rotate on spindle shaft 322 which is powered by a motor (not shown). Information is written on or read from disks 324 by heads or magnetic transducers (not shown) which are supported by sliders 326. The sliders 326 are typically attached to suspensions or load springs 328 which are attached to separate arms 330 on an E block or comb 332. The E block or comb 332 is attached at one end of an actuator arm assembly 336. The actuator arm assembly 336 is rotatably attached with the housing 312 on an actuator shaft 138. For alternative embodiments, various other disk drive designs may be used.

Various embodiments of air bearing sliders having three etch depths are shown in FIGS. 4–6. For the various embodiments described below, the first etch depth is a shallow etch of approximately 0.1 to 0.2 microns; the second etch depth is within the range of 0.5 microns and 5.0 microns; and the third etch depth is the sum of the first and the second etch depths. For alternative embodiments, the first and second etch depths may vary from those described above provided the third etch depth has a specific relationship with the first and second etch depths (e.g., the third etch depth equals the sum of the first and second etch depths). By forming the third etch depth in this manner, the air bearing slider of these embodiments require only a two step etching process. A significant advantage of manufacturing a three etch depth air bearing slider using a two step etching process is that the third etch depth may enhance various aspects of the air bearing slider design while maintaining the manufacturing costs of a two step etching process.

Alternative embodiments of the air bearing sliders of the present invention may include more than three etch surfaces provided that at least one of the etch surfaces is formed by the combination of two etch steps used to form other etch surfaces. Thus, the air bearing slider design may have the advantages associated with increasing the number of etch surfaces without incurring the additional cost of another etch step. For example, one embodiment may include an air bearing slider having four etch surfaces but only requires a three step etching process.

Figure 4A:
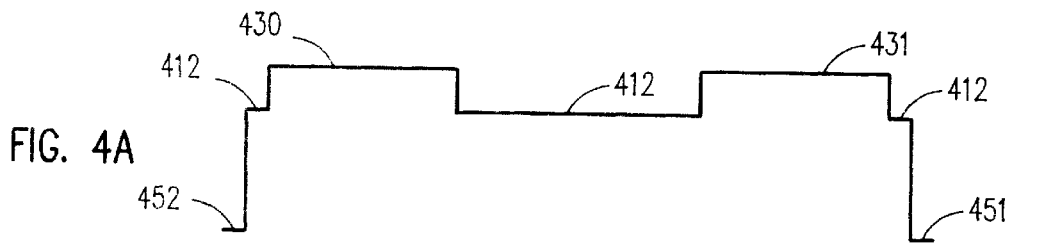
FIGS. 4A–C illustrates one embodiment of the air bearing slider.
Figure 4B:
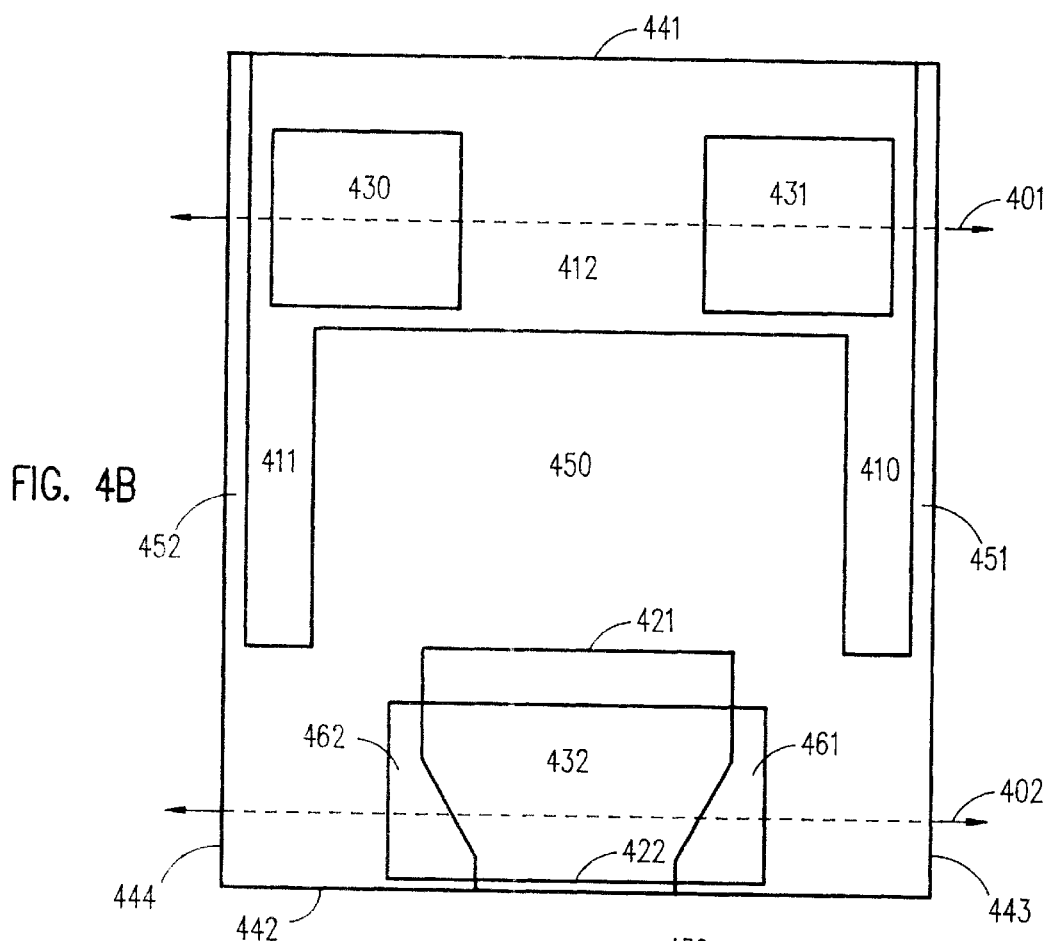
Figure 4C:
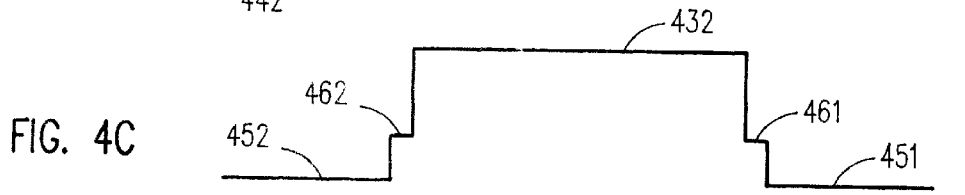

FIGS. 4A–C illustrate one embodiment of a present air bearing slider of the present invention. FIG. 4B is a top view of the air bearing slider 400 having a slider body 440 with a leading edge 441, a trailing edge 442 and two side edges 443 and 444. The air bearing slider 400 includes three etch surfaces formed by a two step etching process. The three etch surfaces have etch depths with respect to the air bearing surface.

According to FIG. 4B, a first etch surface (having the first etch depth) includes a leading step region 420 and trailing step regions 421 and 422; a second etch surface (having the second etch depth) includes lateral step regions 461 and 462; a third etch surface (having the third etch depth) includes a negative pressure region 450 and side regions 451 and 452 of slider body 440; and the air bearing surface includes leading pads 430 and 431 and a trailing pad 432. Each etched surface is etched with respect to the air bearing surface and is substantially planar.

The leading step region 420 and trailing step region 421 are formed by the first etch and are therefore referred to as the first etch surface. The shallow first etch may vary in depth depending on the file environment and the slider size. The leading step region 420 may have two side rails 410 and 411 that join together at leading edge 441 of the slider body 440 by cross rail 412 and extend toward trailing edge 442 of slider body 440. The corners of leading step region 420 may have substantially squared corners, substantially rounded corners, or a combination of rounded and squared corners. For the embodiment shown in FIG. 4B, leading pads 430 and 431 are disposed on the first etch surface formed by leading step surface 420.

The trailing step region 421 is substantially adjacent to the leading edge of trailing pad 432 and trailing step region 422 is substantially adjacent to the trailing edge of trailing pad 432. Accordingly, trailing pad 432 is disposed on the first etch surface formed by trailing step regions 421 and 422.

For one embodiment, leading pads 430 and 431 have a substantially rectangular shape and are formed a predetermined distance within the outer side edges of leading step region 420. The trailing pad 432 has the octagonal shape shown in FIG. 4B. According to FIG. 4B, trailing pad 432 has a neck region that narrows the width of the leading edge of trailing pad 432 such that the width of the trailing edge of trailing pad 432 is small enough to reduce or optimize the minimum fly height tolerance between the element (i.e. the transducer) fly height and the minimum fly height of air bearing slider 400. For alternative embodiments, the shape of leading and trailing pads 430–432 may vary, and the number of leading and trailing pads 430–432 may vary. For example, alternative embodiments may have one leading pad and two trailing pads, or alternatively, two leading pads and two trailing pads. Furthermore, the leading pads may be formed adjacent to the outer side edges of the leading step region 420. Generally, the geometry of the pads are designed to optimize the minimum fly height and the minimum fly height distribution.

The air bearing slider 400 also includes a pair of lateral step regions 461 and 462. For alternative embodiments, an air bearing slider may include two or more pairs of lateral step regions. For the embodiment shown in FIG. 4B, lateral step surfaces 461 and 462 are substantially adjacent to the outer side edges of trailing pad 432. The lateral step surfaces 461 and 462 may extend only a short distance from the outer side edges of trailing pad 432 or may extend all the way to side edges 443 and 444 of slider body 440.

For conventional air bearing sliders, the stepped or tapered region surrounding or adjacent to the pads which form the air bearing surface provides the compression necessary to build sufficient pressure on the pad to enable the air bearing slider to fly the minimum fly height above the disk. Furthermore, the geometry of the pads are designed to optimize the performance of the air bearing slider (i.e., flying height). For many conventional air bearing sliders, when the masks used to form the trailing pad are misaligned during the various etching steps, the fly height of the air bearing slider may be adversely affected.

The embodiment shown in FIG. 4B reduces the sensitivity of air bearing slider 400 to mask misalignments by providing lateral step regions 461 and 462. The lateral step regions 461 and 462, adjacent to the outer side edges of trailing pad 432, provide a deeper step surface at the sides of trailing pad 432 than the step formed by trailing step region 421 at the leading edge of trailing pad 432. Thus, trailing pad 432 relies only on trailing step region 421, and not lateral step regions 461 and 462, for pressurization. Accordingly, when the side edges of the trailing pad 432 deviate somewhat from the nominal (or design) values due to the misalignment of masks during the various etching steps, there is very little impact on the fly height of air bearing slider 400. In other words, lateral step regions 461 and 462 are used to minimize the effect associated with sideway mask misalignments (i.e., mask misalignments along the lateral axis of slider body 440).

For alterative embodiments, the lateral step surfaces are not required to be adjacent to trailing pad 432, but may be positioned anywhere on slider body 440 external to leading step region 420 and trailing step region 421 and 422. Additionally, alternative embodiments may include more than two lateral step surfaces (e.g., four, six, etc.).

The pocket defined by side rails 410 and 411 of leading step region 420 is referred to as the negative pressure region 450 and is formed by the combination of the first and second etching steps. The side regions 451 and 452 of slider body 440 are also formed by the combination of the first and second etching steps. Thus, for one embodiment, negative pressure region 450 and side regions 451 and 452 of slider body 440 have a depth equal to the sum of the first and second etch depths. This depth is referred to as the third etch depth.

FIG. 4A illustrates a cross-sectional view of air bearing slider 400 at line 401. The leading pads 430 and 431 form an air bearing surface, cross rail 412 of leading step region 420 form the first etch surface having the first etch depth, and side regions 451 and 452 of slider body 440 forms the third etch surface having the third etch depth.

FIG. 4C illustrates a cross-sectional view of air bearing slider 400 at line 402. The trailing pad 432 forms an air bearing surface, lateral step surfaces 461 and 462 form the second etch surface, and side regions 451 and 452 of slider body 440 form the third etch surface.

FIGS. 5A–B illustrate another embodiment of the air bearing slider. FIG. 5B is a top view of an air bearing slider 500 having a slider body 540 with a leading edge 541, a trailing edge 542, and two side edges 543 and 544. The air bearing slider 500 also includes three etch surfaces formed by a two step etching process. Each etched surface is etched with respect to the air bearing surface and is substantially planar.

According to FIG. 5B, a first etch surface (having the first etch depth) includes a leading step region 520 and a trailing step region 521; a second etch surface (having the second etch depth) includes lateral step regions 561 and 562; a third etch surface (having the third etch depth) includes a negative pressure region 550 and side regions 551 and 552; and the air bearing surfaces includes leading pads 530 and 531 and trailing pad 532.

The leading step region 520 may have two side rails 510 and 511 that join together at leading edge 541 of slider body 540 by cross rail 512 and extend toward trailing edge 542 of slider body 540. Although the corners of leading step region 520 are generally rounded, alternative embodiments may have substantially squared corners. For the embodiment shown in FIG. 5B, leading pads 530 and 531 are disposed on the first etch surface of leading step surface 520. The corners of the trailing step region 521 adjacent to trailing edge 542 are rounded to avoid or reduce the likelihood of damage to the disk caused by disk dinging by the air bearing slider during load/unload. For alternative embodiments, the trailing corners of trailing step region 521 may not be rounded.

The trailing step region 521 is substantially adjacent to all sides of trailing pad 532. In other words, trailing pad 532 is disposed on the first etch surface of trailing step region 521.

Although leading pads 530 and 531 are substantially rectangular in shape, alternative embodiments may be designed to have a different shape. Furthermore, the number of leading and trailing pads may vary in alternative embodiments. Similar to trailing pad 432 shown in FIG. 4B, trailing pad 532 also includes a neck region such that the width of trailing pad 532 at its leading edge is larger than the width of trailing pad 532 at its trailing edge. The width at the trailing edge of trailing pad 532 is optimized to achieve the minimum fly height tolerance.

The lateral step surfaces 561 and 562 are substantially adjacent to the outer side edges of leading pads 530 and 531, respectively. For one embodiment, the length of lateral step surfaces 561 and 562 extend along the entire lateral or outer side edge of leading pads 530 and 531, and the width of lateral step regions 561 and 562 may extend as far as side edges 543 and 544 of slider body 540, respectively. For the embodiment shown in FIG. 5B, lateral step regions 561 and 562 are wide enough such that the angle θ formed between the outer edges of lateral step regions 561 and 562 and the outer side edges of leading pads 531 and 530 is approximately 9 degrees. For alternative embodiments, the angle θ may be less than or greater than 9 degrees. The angle θ is equivalent to the inverse tangent of the second depth divided by the width of the corresponding lateral step region $$\theta = \mathrm{Tan}^{-1}\left(\frac{\text{second depth}}{\text{width}}\right).$$

The angle θ is shown in FIG. 5A.

FIG. 5A illustrates a cross-sectional view of air bearing slider 500 at line 501. The leading pads 530 and 531 form an air bearing surface, cross rail 512 of leading step region 520 forms the first etch surface having the first etch depth, lateral side regions 561 and 562 form the second etch surface having second etch depth, and side regions 551 and 552 of slider body 540 form the third etch surface having the third etch depth.

Because leading pads 530 and 531 are formed substantially adjacent to the outer side edges of leading step surface 520, the fly height of air bearing slider 500 may be adversely affected if the outer edges of leading pads 530 and 531 are not precisely aligned with the outer edges of leading step region 520. This situation may occur if the masks used to form leading pads 530 and 531 are not aligned properly along the lateral axis of slider body 540 (also referred to as sideway mask misalignment). The air bearing design shown in FIG. 5B reduces the sensitivity of the air bearing slider 500 to sideway mask misalignments. Accordingly, the overall fly height performance of air bearing sliders 500 having lateral step regions 561 and 562 is improved over air bearing sliders without such lateral step regions.

FIGS. 6A–B illustrate another embodiment of the air bearing slider. FIG. 6B is a top view of the air bearing slider 600 having a slider body 640 with a leading edge 641, a trailing edge 642, and two side edges 643 and 644. The air bearing slider 600 also includes three etch surfaces formed by a two step etching process. Each etched surface is etched with respect to the air bearing surface and is substantially planar.

According to FIG. 6B, a first etch surface (having the first depth) includes a leading step region 620 and a trailing step region 621; a second etch surface (having the second depth) includes lateral step regions 661, 662, 663, and 664; a third etch surface (having the third depth) includes a negative pressure region 650 and side regions 651 and 652; and the air bearing surface includes leading pads 630 and 631 and trailing pad 632.

The leading step region 620 may have two side rails 610 and 611 that join together at leading edge 641 of slider body 640 by cross rail 612 and extend toward trailing edge 642 of the slider body 640. The corners of leading step region 620 are substantially squared but may be rounded for alternative embodiments. The leading pads 630 and 631 are disposed on the first etch surface of leading step region 620.

The trailing step region 521 and trailing pad 532 are similar to the rear structure shown in FIG. 5B and will not be discussed in further detail here.

The leading pads 630 and 631 are substantially rectangular but may vary in shape for alternative embodiments. For the embodiment shown in FIG. 6B, negative pressure region 650 extends into pocket region 651 formed between lateral step regions 663 and 664 and cross rail 612. Accordingly, negative pressure region 650 shown in FIG. 6B is generally larger than negative pressure region 550 shown in FIG. 5B. The pocket region 651 may improve the altitude sensitivity of air bearing slider 600 by increasing the area of negative pressure region 650 and hence the minimum flying height of air bearing slider 600.

The lateral step surfaces 661 and 662 are substantially adjacent to the outer side edges of leading pads 631 and 630, respectively, and lateral step regions 663 and 664 are substantially adjacent to the inner side edges of leading pads 631 and 630, respectively. For this embodiment, the length of lateral step regions 661–664 extend along the entire length of leading pads 631 and 630. The width of lateral step regions 661 and 662 may extend as far as side edges 643 and 644 of slider body 640. Similar to the embodiment shown in FIG. 5B, lateral step regions 661 and 662 are wide enough such that the angle θ formed between the outer edges of lateral step regions 661 and 662 and the outer side edges of leading pads 631 and 630 is approximately 9 degrees. For alternative embodiments, the angle θ may be less than or greater than 9 degrees. The width of lateral step regions 663 and 664 may extend through the entire pocket region 651. By providing two pairs of lateral step regions, the embodiment shown in FIG. 6B has a more symmetrical design than the embodiment shown in FIG. 5B, which typically reduces the amount of roll of the air bearing slider. Furthermore, the sensitivity of air bearing slider 600 to sideway mask misalignments is also reduced.

Figure 7:
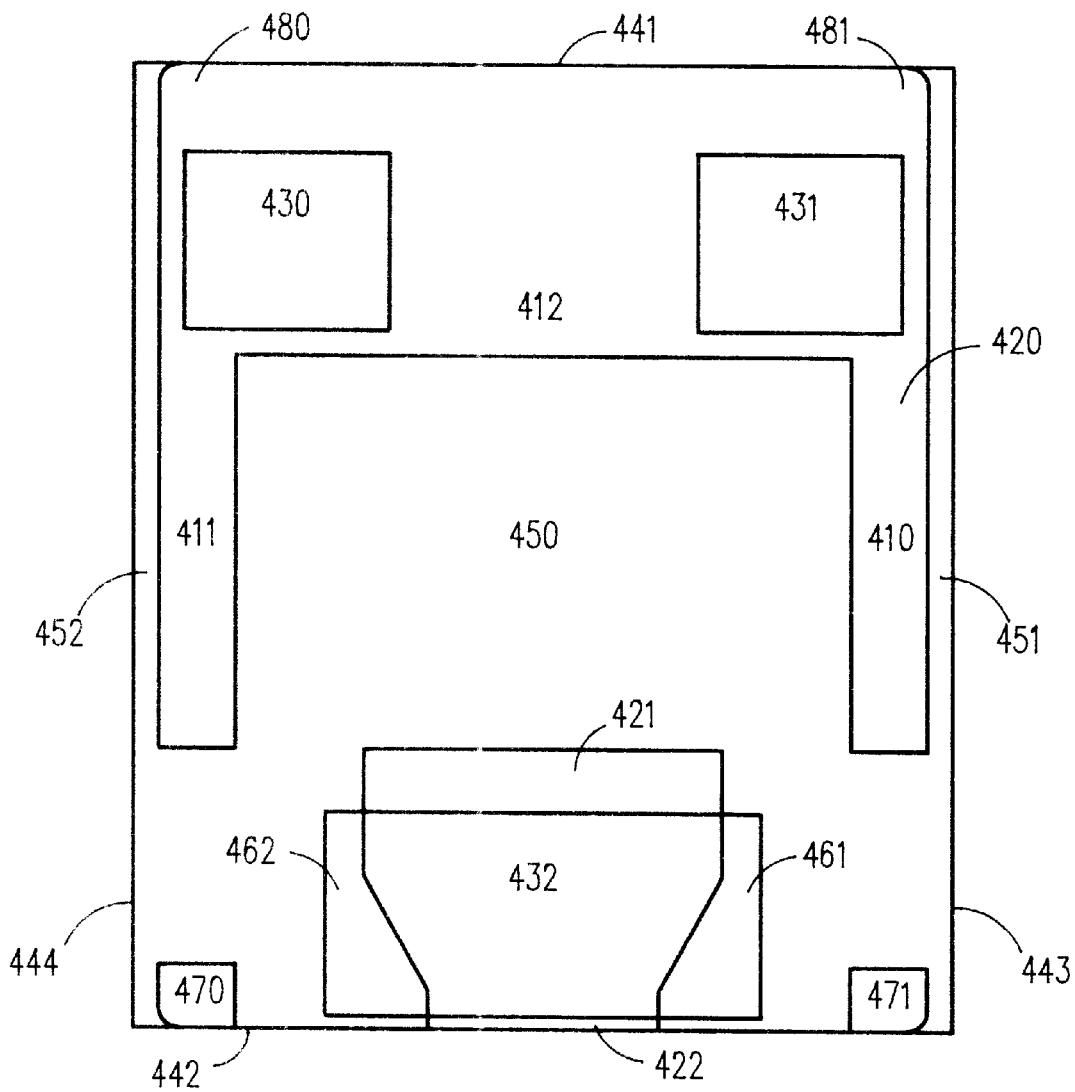
FIG. 7 illustrates one embodiment of the air bearing slider having trailing corner pads.

FIG. 7 illustrates the top view of another embodiment of the air bearing slider. The air bearing slider 700 is similar to air bearing slider 400 with the exception of the rounded corners 480 and 481 at the leading edge of leading step region 420 and the addition of two trailing corner regions 470 and 471. The trailing corner regions 470 and 471 have a substantially planar surface at a first etch depth. For one embodiment, the first etch surface, which includes leading step region 420 and trailing corner regions 470 and 471, are etched by ion milling. Furthermore, the second etch surface, which includes lateral step regions 461 and 462, are etched by reactive ion etching and the third etch surface, which includes negative pressure region 450 and side regions 451 and 452, are etched by the combination of ion milling and reactive ion etching. Typically, the second and third etch surfaces formed by reactive ion etching have a rougher surface than the first etch surface formed by ion milling. Thus, the relatively smooth surface of the first etch surface along with the rounded corners 480 and 481 and the rounded outer corners of the trailing corner region 470 and 471 may minimize damage caused by contact between the corners of the air bearing slider 700 and the disk (i.e., disk dinging) that occurs during the loading or unloading of air bearing slider 700.

Typically, the slider body of the various embodiments described above is formed of a conventional ceramic mixture of titanium carbide (TiC) and alumina ($Al_2O_3$). Although the air bearing sliders of the present invention are generally processed in rows and then cut into individual sliders, the method of forming the various etch surfaces will be described only with respect to a single slider.

Figure 8:
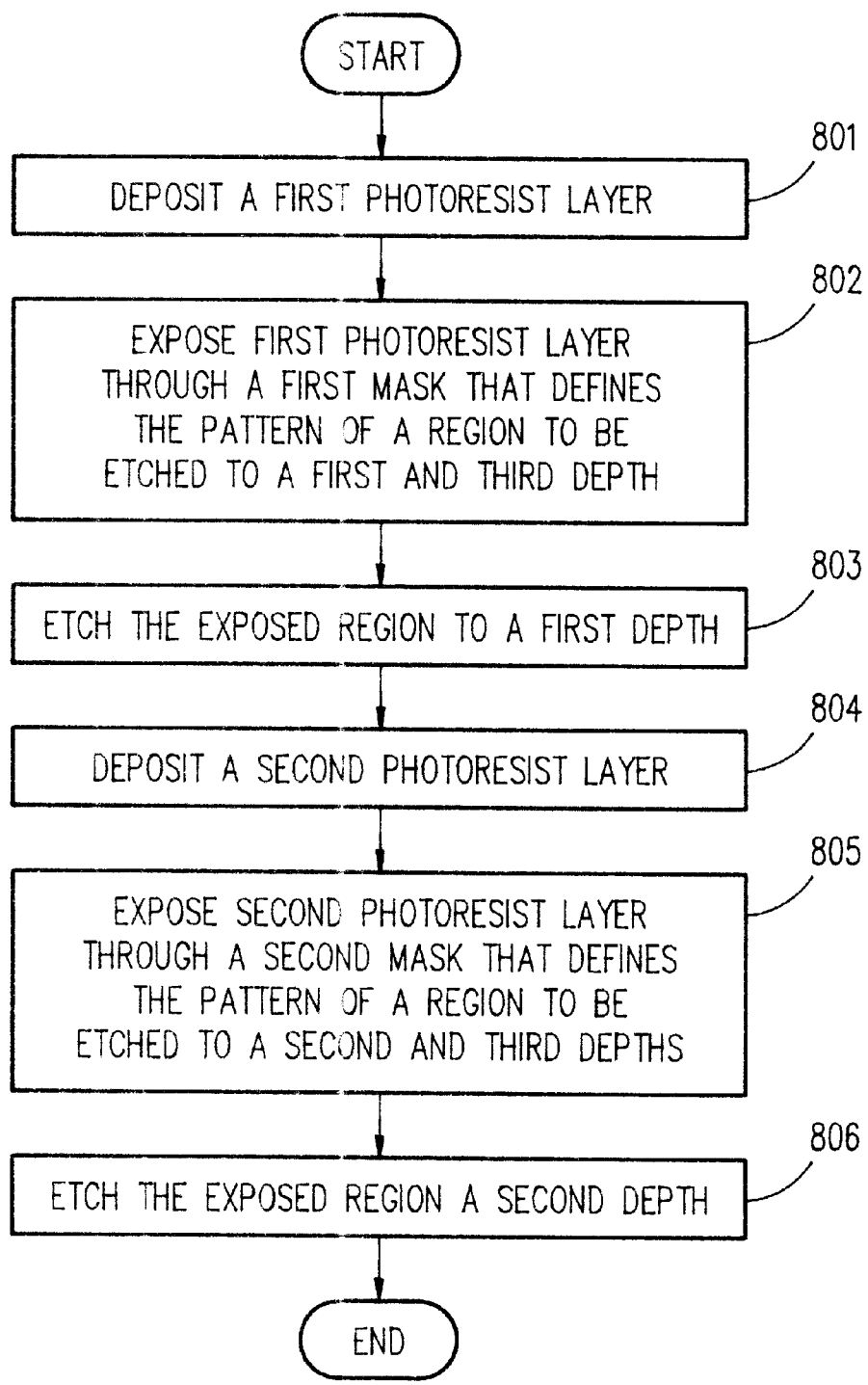
FIG. 8 illustrates a method of forming a three etch depth air bearing slider with a dual etch process.

FIG. 8 is a flow chart that describes one method for a two step etching process used to form the three etch surfaces for the embodiments shown in FIGS. 4–7. At step 801, the air bearing slider is formed by depositing a first photoresist layer on the slider body. The photoresist layer may be a Riston brand of poly methylmethacralate (PMMA). During step 802, the first layer of photoresist is then exposed through a first mask that defines a pattern corresponding to the region to be etched the first and third depths. For the embodiments shown in FIGS. 4–7, the leading step region and the trailing step region are to be etched the first depth, and the negative pressure region and the side regions are to be etched the third depth. Once the first photoresist layer is exposed through the first mask, a pattern is formed on the slider body that exposes the leading and trailing step regions, the negative pressure region, and the side regions. This exposed region is then ion milled or otherwise etched (e.g., reactive ion etching or chemical etching) to the desired depth (i.e., the first etch depth), as shown in step 803. Thus, steps 801–803 form the first etch surface and a portion of the third etch surface.

Steps 804–806 describe the steps for forming the second etch surface and a portion of the third etch surface. The third etch surface is completely formed by the combination of steps 801–806. At step 804, the air bearing slider is formed by depositing a second photoresist layer on the slider body. Next, at step 805, the second layer of photoresist is then exposed through a second mask that defines a pattern corresponding to the region to be etched the second and third depths. For the embodiments shown in FIGS. 4–7, the lateral step regions are to be etched the second depths, and the negative pressure region and the side regions are to be etched the third depth. Once the second photoresist layer is exposed through the second mask, a pattern is formed on the slider body that exposes the lateral step regions, the negative pressure region, and the side regions. This exposed region is then ion milled on otherwise etched (e.g., reactive ion etching or chemical etching) to the desired depth (i.e., the second etch depth), as shown in step 806.

In the foregoing description, the invention has been described with reference to specific exemplary embodiments thereof. It will, however, be evident that various modifications and changes may be made thereto without departing from the broader spirit or scope of the present invention as defined in the appended claims. For example, the present invention is not limited to negative pressure air bearing slider designs, slider designs having a substantially U-shaped leading step surface with two-side rails and a cross rail, and slider designs with two leading pads and one trailing pad. Furthermore, the front (or leading end) structure of the embodiments may be combined with various other rear (or trailing end) structures. For example the front structure of the air bearing slider 600 may be combined with the rear structure of the air bearing slider 400 to form an alternative embodiment. The specification and drawings are, accordingly, to be regarded in an illustrative rather than a restrictive sense.

What is claimed is:

1. An air bearing slider for supporting a transducer, comprising:

an air bearing surface formed by at least one leading pad and at least one trailing pad;

a slider body having a leading edge and a trailing edge;

a leading step region substantially adjacent to the leading edge of the slider body, the leading step region having a first etch depth, at least one of the leading pads formed on the leading step region;

a trailing step region substantially adjacent to the trailing edge of the slider body, the trailing step region having the first etch depth, at least one of the trailing pads formed on the trailing step region;

at least two lateral step regions external to both the trailing and leading step regions and having a second etch depth; and a negative pressure region having a third etch depth, wherein the third etch depth is equal to the sum of the first and second etch depths.

2. The air bearing slider of claim 1, wherein each of the lateral step regions is substantially adjacent to one of the lateral side edges of the leading or trailing pads.

3. The air bearing slider of claim 2, wherein the at least one trailing pad includes a first trailing pad, and wherein a first lateral step region is substantially adjacent to a first outer side edge of the first trailing pad and a second lateral step region is substantially adjacent to a second outer side edge of the first one of the trailing pads.

4. The air bearing slider of claim 3, further comprising two trailing corner regions having the first etch depth.

5. The air bearing slider of claim 4, wherein the two trailing corner regions have rounded outer corners.

6. The air bearing slider of claim 3, wherein the at least one leading pad includes a first and a second leading pad, the first and the second leading pad each provide a substantially rectangular air bearing surface, and are positioned equidistant within the outer side edges of the leading step region.

7. The air bearing slider of claim 6, wherein the leading step region has at least two substantially squared corners.

8. The air bearing slider of claim 3, wherein the first trailing pad provides an octagonal air bearing surface, and wherein leading and trailing edges of the first trailing pad are substantially adjacent to the trailing step region.

9. The air bearing slider of claim 8, wherein a surface of the trailing step region has at least two substantially squared corners.

10. The air bearing slider of claim 1, wherein the leading step region has two side rails joined together by a cross rail substantially adjacent to the leading edge and extending toward the trailing edge of the slider body.

11. A data storage device, comprising:

a storage medium including a plurality of tracks;

a slider for supporting a transducer over the plurality of tracks, the slider further comprising:

an air bearing surface formed by at least one leading pad and at least one trailing pad;

a slider body having a leading edge and a trailing edge;

a leading step region substantially adjacent to the leading edge of the slider body, the leading step region having a first etch depth, at least one of the leading pads formed on the leading step region;

a trailing step region substantially adjacent to the trailing edge of the slider body, the trailing step region having the first etch depth, at least one of the trailing pads formed on the trailing step surface;

at least two lateral step regions external to both the trailing and leading step regions and having a second etch depth; and a negative pressure region having a third etch depth, wherein the third etch depth is equal to the sum of the first and second etch depths;

a motor, coupled to the storage medium, for moving the storage medium relative to the slider; and an actuator assembly connected to the slider body for moving the slider body generally transversely relative to the direction of a track on the storage medium so the transducer may access different regions on the storage medium.

12. The data storage device of claim 11, wherein each of the lateral step regions is substantially adjacent to one of the lateral side edges of the leading or trailing pads.

* * * * *